(12) United States Patent
Rohden (10) Patent No.: US 9,073,607 B2
(45) Date of Patent: Jul. 7, 2015

(54) ELECTRIC MOTOR EXCHANGE

(75) Inventor: Rolf Rohden, Aurich (DE)

(73) Assignee: Wobben Properties GmbH, Aurich (DE)

( * ) Notice: Subject to any disclaimer, the term of this patent is extended or adjusted under 35 U.S.C. 154(b) by 187 days.

(21) Appl. No.: 13/822,403

(22) PCT Filed: Sep. 9, 2011

(86) PCT No.: PCT/EP2011/065628
§ 371 (c)(1),
(2), (4) Date: May 21, 2013

(87) PCT Pub. No.: WO2012/034938
PCT Pub. Date: Mar. 22, 2012

(65) Prior Publication Data
US 2013/0233230 A1 Sep. 12, 2013

(30) Foreign Application Priority Data
Sep. 16, 2010 (DE) .......................... 10 2010 040 907

(51) Int. Cl.
| | |
|---|---|
| B63H 21/17 | (2006.01) |
| B63B 27/00 | (2006.01) |
| B63B 9/00 | (2006.01) |
| B63B 21/30 | (2006.01) |
| B63H 9/02 | (2006.01) |
| H02P 5/00 | (2006.01) |

(52) U.S. Cl.
CPC ........... *B63B 27/00* (2013.01); *Y10T 29/49718* (2015.01); *B63B 9/00* (2013.01); *B63B 21/30* (2013.01); *B63H 9/02* (2013.01); *B63H 21/17* (2013.01); *Y02T 70/58* (2013.01); *H02P 5/00* (2013.01)

(58) Field of Classification Search
USPC ......................................... 440/6, 8
IPC ......................... B63H 23/24,13/00, 9/02, 21/17
See application file for complete search history.

(56) References Cited

U.S. PATENT DOCUMENTS

| | | | |
|---|---|---|---|
| 4,036,163 A | 7/1977 | Pehrsson | |
| 4,678,439 A | 7/1987 | Schlichthorst | |
| 4,705,180 A * | 11/1987 | Lamer et al. ................. | 212/307 |
| 4,916,382 A * | 4/1990 | Kent ............................. | 323/299 |
| 5,445,094 A | 8/1995 | Kai et al. | |
| 6,439,936 B1 * | 8/2002 | Dreith et al. .................... | 440/54 |
| 8,362,638 B2 | 1/2013 | Gemin et al. | |
| 2007/0138021 A1* | 6/2007 | Nicholson ..................... | 205/628 |

(Continued)

FOREIGN PATENT DOCUMENTS

| | | |
|---|---|---|
| AU | 758503 B2 | 2/2000 |
| CN | 101165880 A | 4/2008 |
| CN | 201190634 Y | 2/2009 |

(Continued)

*Primary Examiner* — Stephen Avila
(74) *Attorney, Agent, or Firm* — Seed IP Law Group PLLC (57) ABSTRACT

The invention concerns a ship comprising at least one motor for driving the ship and at least one crane. To lift the motor at least one crane can be brought into engagement with the at least one motor through at least one closable opening. The invention further concerns a ship drive for driving a ship as well as a method of exchanging ship motors arranged within a ship for driving the ship together with peripheral devices. The invention further concerns the use of a wind power installation generator.

20 Claims, 4 Drawing Sheets

(56) References Cited

U.S. PATENT DOCUMENTS

| | | |
|---|---|---|
| 2010/0060076 A1 | 3/2010 | Gemin et al. |
| 2012/0175947 A1 | 7/2012 | Gemin et al. |

FOREIGN PATENT DOCUMENTS

| | | |
|---|---|---|
| CN | 201371920 Y | 12/2009 |
| CN | 201400296 Y | 2/2010 |
| CN | 201411038 Y | 2/2010 |
| CN | 101665149 A | 3/2010 |
| DE | 3426333 A1 | 1/1986 |
| DE | 10 2008 018 420 A1 | 10/2009 |
| DE | 102009043886 A1 | 3/2010 |
| EP | 1614621 A2 | 1/2006 |
| EP | 2 117 111 A1 | 11/2009 |
| EP | 2243699 A1 | 10/2010 |
| JP | 60-33187 A | 2/1985 |
| JP | 07-010071 A | 1/1995 |
| JP | 07-010072 A | 1/1995 |
| JP | 08192789 | 7/1996 |
| JP | 2005-354861 A | 12/2005 |
| JP | 2008-024187 A | 2/2008 |
| TW | 259770 A4 | 4/1983 |
| WO | 9414649 A1 | 7/1994 |
| WO | 2006/133950 A2 | 12/2006 |

\* cited by examiner

Fig. 4

ELECTRIC MOTOR EXCHANGE

BACKGROUND

1. Technical Field

The invention concerns a ship comprising at least one motor for driving the ship and at least one crane.

2. Description of the Related Art

The drive for ships by means of engines or electric motors is known in many various forms. In that respect cargo ships generally use diesel assemblies of large volume. In smaller ships or also sailing ships electric motors are in part also known as the drive for same. So-called diesel-electric drives are also known, in which an electric motor serves as a drive but the electrical energy for operation of the electric motor is converted by means of diesel assemblies.

Such a drive by means of electric motors is disclosed for example in DE 10 2008 018 420 A1. That document discloses a drive device for a ship having a drive shaft for driving a propulsion unit of the ship in the form of a screw and a first and a second electric motor for driving the propulsion unit. The two motors are arranged in succession on the drive shaft, wherein the current converter for feeding electric current to the motors is disposed in the housing of the first motor. Thus one motor can be specifically designed for travel within a port while the second motor is optimized for high-speed travel.

If one of the motors fails the ship can continue to be moved with the second motor. It is sub-optimum for travel in the borderline case to have to be continued with a motor which is not optimized for that travel mode.

A further problem involves maintenance and repair of such motors. They are usually maintained and repaired on board the ship, for the drive of which they are designed. That means that the ship must remain in a port and cannot be used over the entire period of maintenance or repair. That causes high cost levels, particularly in the case of cargo ships, as not only does that involve the maintenance and repair costs as well as the berthing costs in the port, but also the costs which arise due to non-use of the ship are to be taken into account. Maintenance or repair is made more difficult by virtue of the fact that the space around the motors is generally very constricted. The lighting conditions in a ship's engine room are also not optimum.

If major repairs are to be performed on the ship motors they are also partially exchanged. For that purpose the motors generally have to be dismantled and removed from the ship. That is a highly time- and cost-intensive activity.

BRIEF SUMMARY

One or more embodiments of the present invention provides a ship having a motor which is simple and inexpensive to maintain and repair. The embodiment further provides an energy-saving and reliable drive for a ship.

One embodiment is directed to a ship drive for driving a ship having a propulsion unit, at least a first and a second electric motor and a unit for transmitting the power of the electric motors to the propulsion unit so that the electric motors are to be operated selectively or jointly. Another embodiment is directed to a method of exchanging ship motors which are arranged within a ship for driving the ship together with peripheral devices and are coupled to a propulsion unit, wherein the ship has at least one closable opening and at least one crane.

To lift the motor at least one crane can be brought into engagement with the at least one motor through at least one closable opening With a ship according to the invention it is possible for the motor to be lifted out of the ship through the closable opening by the ship's own crane. That means that maintenance or repair no longer has to be effected within the engine room, and it is no longer necessary to use a port or shipyard crane. According to one embodiment of the invention it is possible to lift the motor which is defective or which is to be maintained, for example on to a deck of the ship, by the crane, and to repair it or maintain it there. In that respect the deck involved may be the main deck, the weather deck, or all intermediate decks. If the ship has other or further decks they are also embraced by the term deck. It is also possible for the motor to be conveyed into a special repair room or storage room on the ship. A further advantage is that the motor which is defective or which is to be maintained can be quickly exchanged for a new one so that the ship can continue its voyage immediately after a short stop. If no electric motor is available it is then possible to fit a diesel engine. One advantage which is afforded by the use of a plurality of motors is that the ship does not become incapable of maneuver if a motor should be defective. The ship can continue to be moved with the second, third and so forth motor.

The crane includes all kinds of on-board ship cranes. Generally such cranes have an arm or a lever as well as an apparatus for lifting or holding articles. That apparatus can be for example a hook or a combination of a plurality of hooks. In particular such an apparatus could be a crane transverse lifting beam as are frequently used for lifting large-volume or unwieldy loads. In that respect the term bringing the crane into engagement with the motor is to be interpreted as meaning that essentially the lifting or holding apparatus comes into engagement with the motor. According to one embodiment of the invention the crane, opening and motor are arranged relative to each other, in dependence on the respective kinds of structure, sizes and installation situations, so that the motor can be lifted out.

In addition, in a ship drive of the kind set forth in the opening part of this specification, the object of the invention is attained in that associated with each electric motor are at least one and preferably a plurality of current converters and the current converters are arranged in spaced relationship with the electric motor.

A ship drive according to the invention provides that maintenance or repair and in particular removal or interchange of motors is greatly facilitated. As the motors can be selectively activated it is possible to also operate only one of the motors. Preferably the motor is always to be operated, which is arranged closer to the propulsion unit within the drive train. Spatial proximity of the motors additionally facilitates exchange thereof. According to one embodiment of the invention in that respect associated with each motor is at least one and preferably a plurality of current converters specific thereto, which are arranged spaced from the motor. Here any suitable kind of current converter such as for example inverters or DC-AC inverters can be used as the current converter. It is also preferable to use inverters as they are known from operation in wind power installations. Depending on the respective design configuration they can also be used alternatively. Here arranged in spaced relationship is intended to mean that the current converters are not part of the motor or a motor housing but are nonetheless electrically connected thereto. The advantage of the fact that each motor has at least one and preferably a plurality of current converters is that the motors and the current converters are to be operated independently of each other. If one or more current converters should be defective then travel can be continued by means of the further current converters. The advantage of the spaced relationship of the current converters is that they can remain within the ship when the motors are removed. That is advantageous particularly when a defective motor or a motor to be maintained is to be exchanged for a new one.

One embodiment is directed to a method comprising the steps:
uncoupling at least one motor from the propulsion unit and from the at least one further motor,
uncoupling at least one motor from the peripheral devices,
releasing the releasable connection of at least one motor to the ship,
opening the closable opening of the ship,
bringing the crane into engagement with the at least one uncoupled and released motor, and
lifting out or transposing the motor by means of the crane (claim 18).

Simple removal or simple exchange of motors is advantageously afforded by the method according to the invention. In that respect the sequence in which the individual steps are carried out is not essential for the invention. They may also at least in part take place at the same time. The repetition of individual steps is also possible and in accordance with the invention.

Another embodiment is directed to use of a wind power installation generator, wherein the generator is motor-operated, as the motor in a ship according to the invention or in a method according to the invention or as an electric motor in a ship drive according to the invention.

That is particularly advantageous as such generators in motor-powered operation have adequate power to move even relatively large ships. In addition the specific configuration of such motors permits a large rotary speed range for the propulsion unit, even without a transmission arrangement. Furthermore an object is advantageously attained by such use as such machines can be operated in particularly energy-saving fashion and are particularly low in wear, due to the slow speed of rotation. In addition the noise generated by such machines, also because of the slow speed of rotation, is particularly slight so that there is no need to provide a specific or additional motor for in-port travel.

In a particularly preferred embodiment of the ship the closable opening is closable by a hatch cover or a removable floor panel or an element designed in the manner of a removable intermediate deck or a combination of hatch covers, floor panels and/or intermediate decks. Such a removable intermediate deck or a removable floor panel permits the simultaneous use of the deck or the floor panel as a cargo and stowage surface and as a protective covering for the motors. A hatch is advantageous in particular as an opening to a main deck or weather deck to protect the motors for example from the ingress of water. The hatch cover, the floor panel or the intermediate deck are advantageously arranged substantially above the motors. It is further advantageous if they are arranged one above the other and in the opened condition clear a straight free shaft or path from the deck to the motors, through which the crane can be brought into engagement with the motor.

In a further preferred embodiment the hatch covers, floor panels and/or intermediate decks have lashing points to come into engagement with the at least one crane. It is easier by means of the lashing points to lift and/or move the above-mentioned elements.

In a further preferred embodiment the closable opening can be opened and closed by means of the crane. That is possible in particular when the hatch covers, floor panels or intermediate decks have lashing points. It is in accordance with the invention and advantageous if the crane is adapted to expose the motors by lifting and transposing the hatch covers, floor panels or intermediate decks.

In a further preferred embodiment the crane is adapted to move, in particular to transpose, the at least one motor within or outside the ship, and to lift it on to a platform of the ship or on to a platform outside the ship. In that way the motor can be maintained or repaired outside the engine room, or can also be replaced by another motor.

In a further preferred embodiment the motors have lashing points. The motors can be more easily transported by means of the crane in that way. The lashing points can be screwed or welded in place. They can be in the form of eyes or recesses in a motor housing. They can also be mounted to a foundation of the motor so that the motor is to be lifted together with the foundation.

In a further preferred embodiment the motors are fixed to the ship by means of a releasable connection. The term releasable connection is here used to denote all connections which are reversibly releasable. Thus in particular screw connections or plug-in and clamping connections. A releasable connection greatly facilitates removal of the motor.

In a further preferred embodiment the motors are arranged on a rail system so that the motors can be displaced in the interior of the ship. Such a rail system may be for example of such a design that the motors can be changed even without opening the closable opening, within the ship. Thus for example the sequence of motors could be altered. A rail system is also advantageous if the closable opening is not arranged directly perpendicularly above the motor and the motor first has to be moved towards the opening.

In a preferred configuration of the ship drive the unit for transmitting the power is a shaft and the at least first and second electric motors and the propulsion unit are arranged on said shaft. Because the motors are arranged on a common shaft, a coupling unit such as for example a transmission is no longer required, but selective activatability of the motors is still retained. Because no transmission is necessary to bring together the power of the at least first and second motors and to pass it to the propulsion unit, the drive is particularly low-maintenance. In addition it is possible in that way to achieve a smaller installation size and lower weight.

In a further preferred embodiment of the ship drive couplings are arranged on the shaft between the at least first and second electric motors and/or the electric motors and the propulsion unit. In that way the motor which is currently not in operation can be uncoupled from the drive train. It is particularly preferred for the motors which are arranged at a distal end of the shaft with respect to the propulsion unit to be uncoupled. The couplings can be for example rigid couplings such as for example a disc-type coupling or also compensating couplings such as for example shaft joints. In addition it is also possible to use shiftable couplings or clutches. That is advantageous if the ship has a control device so that the coupling clutches can be remotely shifted by means of a control device.

In a preferred embodiment of the ship drive the electric motors are in the form of ring motors comprising an internally rotating rotor and a stator ring which is disposed outwardly in the radial direction. Ring motors are particularly suitable for such a drive for a ship, because of their structural shape. In particular this means that transmission arrangements for converting a speed of rotation do not necessarily have to be provided, even if that may be preferred, depending on the respective design configuration involved.

In a preferred embodiment of the ship drive the electric motors are of substantially the same structure. That provides for a further development in terms of selective activatability. Particularly if the motors are of the same structure they can substantially completely replace each other. The expression of substantially the same structure is not used here to mean that the motors have to be identical. That is already not advantageous by virtue of the arrangement in the drive train. Rather, the term of identical structure is used to mean that the motors are of substantially the same type. It is also advantageous if they produce substantially the same power. It is further advantageous if the motors have substantially the same connections for electrical energy and/or further peripheral devices.

In a preferred embodiment of the invention the electric motors have a cooling arrangement. The high power levels that such motors provide usually give rise to a great rise in temperature. The rise in temperature can be reduced by means of cooling so that on the one hand the material is treated gently and carefully while on the other hand the power loss by virtue of the electrical resistances which are increased by the rise in temperature is reduced. Cooling can be effected here in widely different forms. All conventional cooling arrangements which can be provided by a man skilled in the art are to be considered.

In a preferred embodiment of the ship drive the current converter has a cooling arrangement. The current converters like for example inverters or DC-AC converters can be heated by the high level of power to be delivered. Here too a cooling arrangement is advantageous. That cooling arrangement does not have to be the same cooling arrangement as that for the motors. The two cooling arrangements can use different principles. They also do not have to be coupled in any fashion. They can be provided and set up completely independently of each other.

In a preferred embodiment of the ship drive the cooling arrangement is an air cooling arrangement. By the cooling arrangement being in the form of an air cooling arrangement, oxidation which usually occurs in the case of water cooling arrangements is reduced. A further advantage of air cooling is the lower maintenance and lesser susceptibility to faults. In the case of a leakage in the cooling apparatus, no cooling water, oil or a similar coolant can escape. There are various possible ways of cooling the motor when using an air cooling arrangement. On the one hand air can be caused to flow around the stator or stator ring of the electric motor, or air can be passed through the gap between the stator and the rotor. It is also possible to pass air through openings in the rotor or to provide cooling passages in the stator. Those individual possible options can also be combined as desired by a man skilled in the art. In a further preferred embodiment the cooling arrangement is in the form of a water cooling arrangement. Water has the advantage over air that more heat can be transported away from the element to be cooled. That cooling method is advantageously used in relation to the current converters.

In a preferred embodiment of the ship drive it is arranged in a ship according to the invention. Such a ship drive means that the advantages of the ship according to the invention can further be advantageously used.

In a preferred embodiment of the method of exchanging ship motors the first four steps are performed in an interchanged sequence. The first four steps involve uncoupling the motor from a drive and from the peripheral devices, as well as releasing the releasable connection and opening the closable opening. It is apparent and advantageous that those steps are not always to be performed in that sequence. Depending on the maintenance, repair or other problem involved, and depending on the available workforce or the like, it may be advantageous to perform the steps in an altered sequence. If necessary one or more of those steps can also be omitted or replaced by other steps. Here the term uncoupling from a drive is used to mean that the motor in question is no longer coupled to a drive train.

In a further preferred embodiment of the method the method additionally includes the step of 'lifting in or moving in a motor by means of the crane'. The inclusion of such a step is advantageous if a motor is to be exchanged. It is also advantageous if, arranged in a region adjacent to the drive train, there is a motor which is to be transposed into the drive train. The inclusion of further similar steps is also possible. Thus, that step also embraces just the operation of changing the motors. Lifting in peripheral devices or moving them in can also be advantageous and is intended to be embraced.

In a further preferred embodiment of the method the method additionally comprises the step of closing the closable opening. The step of closing the closable opening is advantageous for example after the operation of removing a motor has been completed. Closing the opening makes it possible for the ship to be fully used again and for the ship to continue its voyage on open waters. If necessary however a voyage can also be continued with the opening not closed.

In a further preferred embodiment of the method the method is used in relation to a ship according to the invention or a ship drive according to the invention. That means that the aforementioned advantages of the ship and the ship drive according to the invention are further advantageously used.

In a preferred embodiment of the use of a wind power installation generator as the motor in a ship, a plurality of such machines are used, which are of substantially the same structure. That provides a further development in terms of selective drive. If the machines are of the same structure that they can substantially completely replace each other. The expression of substantially the same structure is not used here to mean that the motors have to be identical. That is already not advantageous by virtue of the arrangement in the drive train. Rather, the term of identical structure is used to mean that the motors are of substantially the same type. It is also advantageous if they produce substantially the same power. It is further advantageous if the motors have substantially the same connections for electrical energy and/or further peripheral devices.

BRIEF DESCRIPTION OF THE SEVERAL VIEWS OF THE DRAWINGS

The invention is described hereinafter by means of an embodiment by way of example with reference to the accompanying drawings in which.

DETAILED DESCRIPTION

Figure 1:
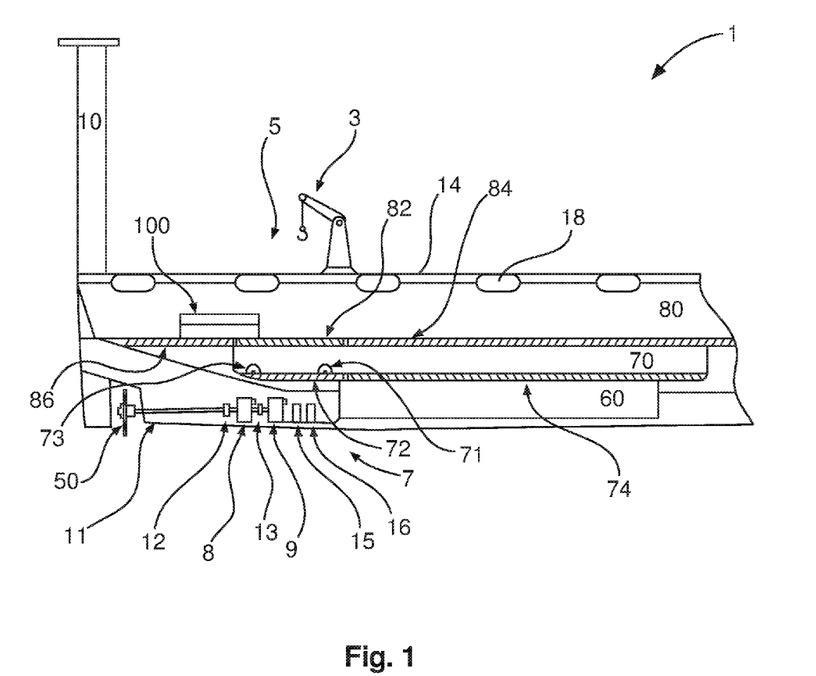
FIG. 1 shows a partly broken-away side view of a stern of a ship according to the invention.
Figure 2:
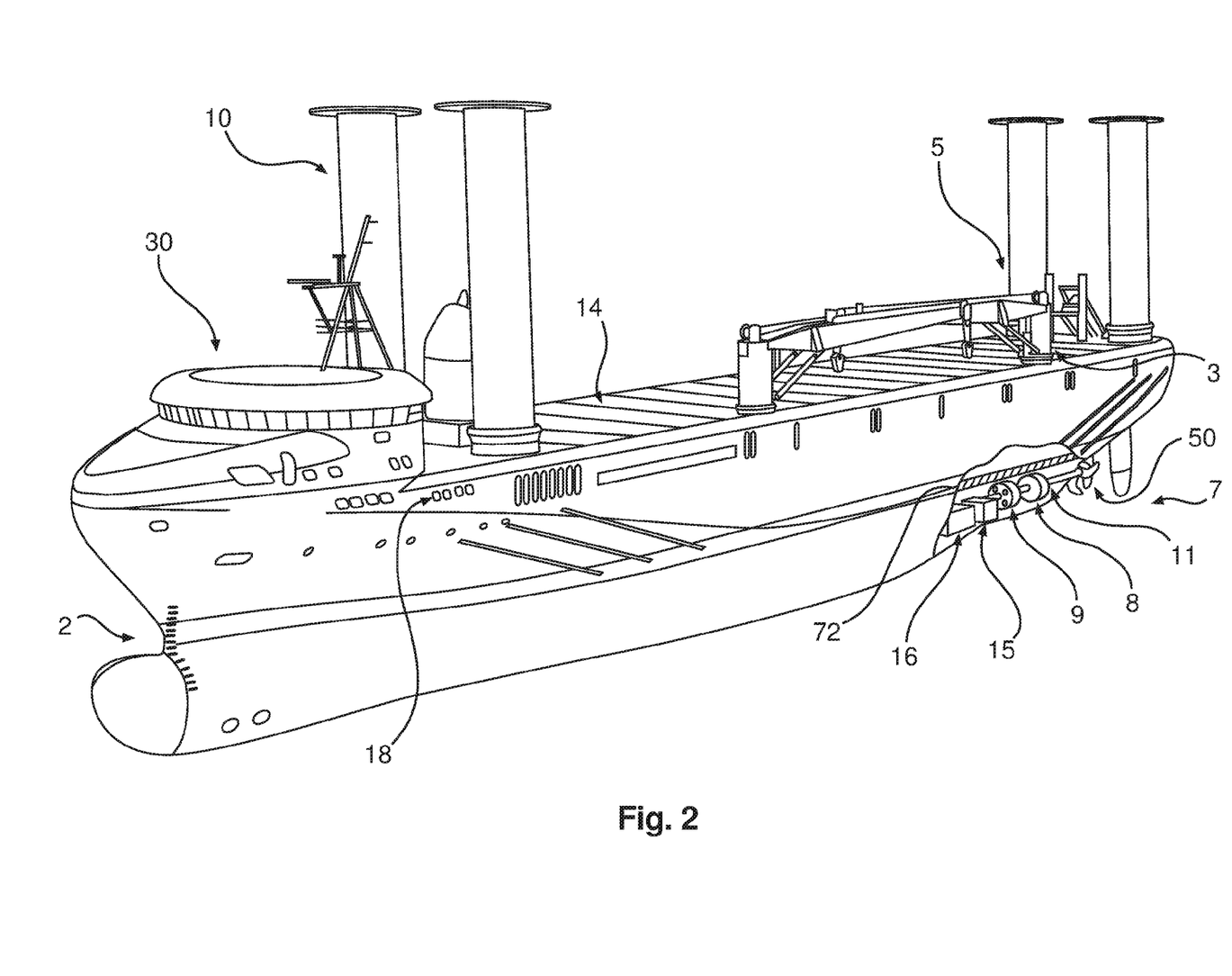
FIG. 2 shows a further perspective view of the ship according to the invention in FIG. 1.

The stern shown in FIGS. 1 and 2 of the ship 1 has a hull 2, a crane 3 (only diagrammatically shown in FIG. 1), a closable opening 5 and a ship drive 7. In this respect the drawing shows Magnus rotors 10 which are used as a sailing drive for the ship 1. Magnus rotors are also referred to as Flettner rotors or sailing rotors. The Magnus rotors 10 are each arranged in the four corners of the rectangle defined by the weather deck 14, on the hull 2 (FIG. 2). FIG. 2 shows two cranes, wherein only one crane 3 is arranged adjacent to the closable opening 5.

The crane shown in FIG. 2 is substantially preferred over that in FIG. 1. FIG. 2 further shows the bridge 30 of the ship 1. The weather deck 14 has portholes 18 which can be covered with transparent material to provide protection from weather influences or sea water. In addition the three load decks are also shown, that is to say a lower space 60, a first intermediate deck 70 and a second intermediate deck 80. The ship has a propulsion unit 50 which is represented here as a propeller. For improved maneuverability the ship 1 can also have transverse thruster rudders, wherein preferably one is provided at the stern and one to two are provided at the bow. Preferably those transverse thruster rudders are electrically driven. The accommodation quarters, galleys, provision store rooms, messes and so forth are arranged in the deckhouse 40.

The intermediate decks 60, 80 are delimited downwardly by a floor. In this case the floor of the first intermediate deck 70 in this embodiment comprises a removable floor panel 72 and a stationary floor panel 74. The floor of the second intermediate deck 80 has three portions: a removable floor panel 82, a first stationary floor panel 84 and a second stationary floor panel 86. The closable opening 5 is opened by the two removable floor panels 72, 82 being taken out or displaced. The two removable floor panels 72, 82 are here arranged in mutually superposed relationship in such a way that the path which is closed by them is arranged substantially perpendicularly above the ship drive 7. In this case the crane 3 is arranged on the deck 14 in such a way that it can be brought into engagement with the ship drive 7 through the closable opening 5. If the removable floor panels 72, 82 are not removed they therefore close the closable opening 5 and the intermediate decks 70, 80 can be normally loaded with cargo 100. In this embodiment therefore not only do the removable floor panels 72, 82 have to be taken out to open the closable opening 5, but in addition any cargo 100 stored on the removable floor panels 72, 82 also has to be removed from the portion having the closable opening 5. For that purpose it is further advantageous if the floor panels have lashing points 71, 73 so that they can be taken out by the crane 3. It is particularly advantageous if the floor panel can be removed by a crane transverse lifting beam. In an alternative embodiment (not shown here) the removable floor panels co-operate with a rail system so that they can be displaced to open the closable opening 5.

Here the ship drive 7 is arranged in a lower rear region of the hull 2. In this embodiment the ship drive comprises two motors 8, 9, two current converter cabinets 15, 16 with a total of 56 current converters, two couplings 12, 13, a shaft 11 and a propulsion unit 50 which here is in the form of a propeller (FIGS. 1 to 4). In that case one of the current converter cabinets 15, 16 is associated with each of the motors 8, 9. The current converter cabinets 15, 16 are arranged in spaced relationship with the motors 8, 9. Thus it is possible for the motors 8, 9 to be lifted out of the ship 1 without the current converter cabinets 15, 16 or for a motor 8, 9 to be exchanged without at the same time also exchanging the corresponding current converter cabinet 15, 16. At the same time the motors 8, 9 can thus be operated independently of each other. As the ship drive 7 is arranged in a rear region of the hull the shaft 11 can be short and does not have to be extended through the entire ship. The shaft 11 here forms the common shaft for the motors 8, 9 and the propulsion unit 50. That is also indicated by the center line R in FIG. 3. The motors 8, 9 could also be arranged in parallel (not shown here). Then a transmission would have to be provided between the motors 8, 9 and the propulsion unit 50 to couple the drive output power of the motors 8, 9 and pass it to the propulsion unit 50. As transmissions often represent an increased maintenance complication and expenditure, the embodiment shown here is preferred.

Figure 3:
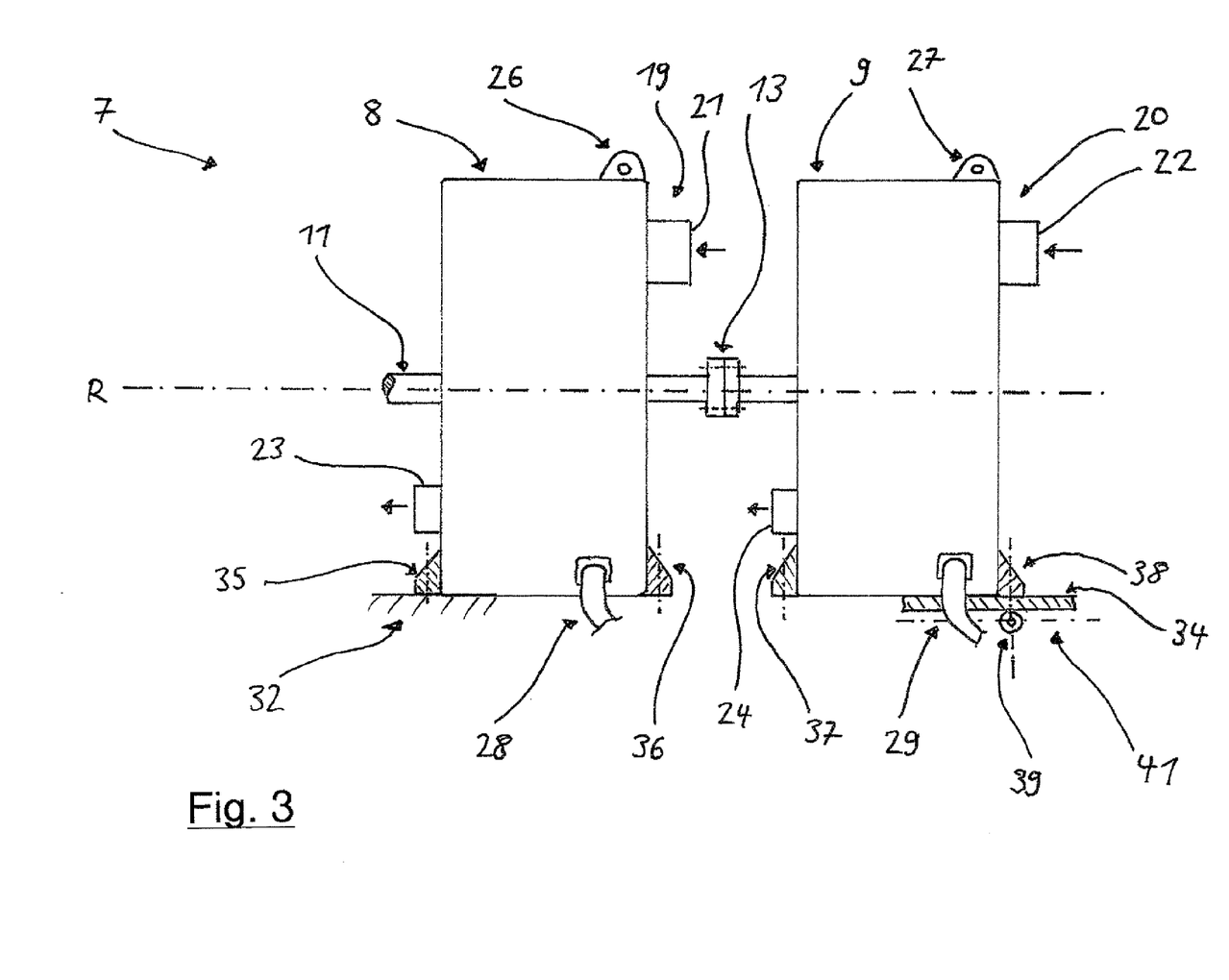
FIG. 3 shows a ship drive according to the invention.
Figure 4:
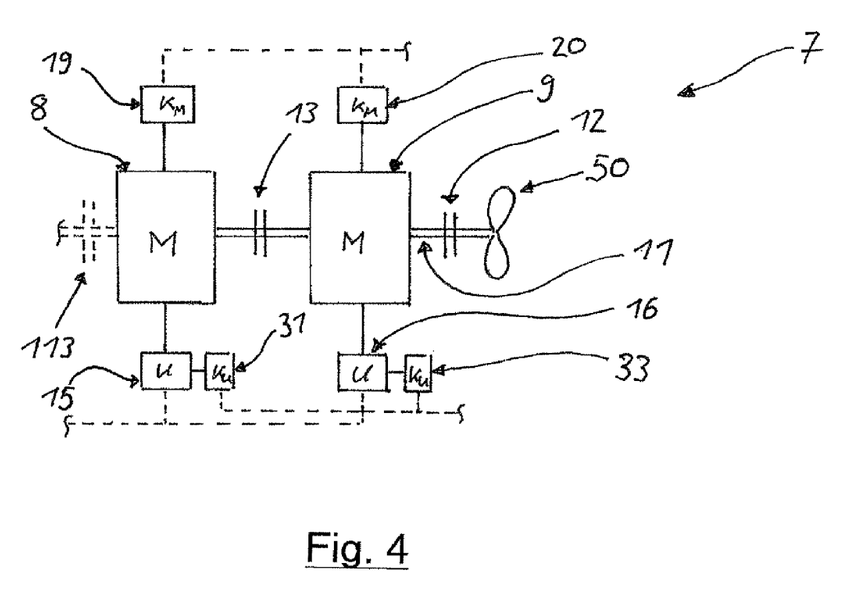
FIG. 4 shows a diagrammatic view of the ship drive of FIG. 3.

Couplings 12, 13 are respectively arranged on the shaft 11 between the motors 8, 9 and between the second motor 8 and the propulsion unit 50 (FIGS. 1, 3 and 4). In FIG. 3 the coupling 13 between the two motors 8, 9 is in the form of a rotationally stiff all-metal coupling such as for example a braided steel-flex coupling. Here, depending on the respective configuration involved, it may be equally advantageous to provide a compensating coupling. The shaft 11 is shown in broken-away form on the left-hand side in FIG. 3. That makes it clear that the propulsion unit 50 can be arranged on the shaft 11 after the second motor 8, on the one hand, but it is also possible here to arrange a third, fourth and so forth motor. That is also diagrammatically shown in FIG. 4 insofar as a coupling 113 is shown in broken line beside the second motor 8.

Besides the motors 8, 9, the shaft 11 and the coupling 13 FIG. 3 also shows cooling arrangements 19, 20, lashing points 26, 27 and the releasable connection 35, 36, 37, 38 with which the motors 8, 9 are connected to a foundation 32 (only diagrammatically indicated). The motors 8, 9 are shown here in the form of motors of substantially the same structure. In this case a cooling arrangement 19, 20 is associated with each motor 8, 9. The cooling arrangements 19, 20 are here in the form of air cooling arrangements. Arranged in the upper region of the motors 8, 9 are the air inlets 21, 22, with the air outlets 23, 24 in a lower region. The arrows in front of the air inlets and outlets show the air flow through the motor 8, 9. The cooling arrangements 19, 20 can be coupled in any fashion or can also be provided independently of each other. That is also shown in FIG. 4 by the broken line connecting the two cooling arrangements 19, 20. The dotted line which is broken away on the right-hand side indicates that the cooling arrangements 19, 20 can also be coupled to a central cooling arrangement. In individual cases it may also be advantageous not to provide any cooling arrangement.

The releasable connections 35, 36, 37, 38 are arranged in a lower portion of the motors 8, 9 in FIG. 3 below the air outlets 23, 24. Here they are in the form of screw connections between an extension of the motor 8, 9 or a motor housing and the foundation 32. Even if only four screw connections 35, 36, 37, 38 are shown in FIG. 3 the motors 8, 9 can have a plurality of screw connections or other releasable connections to a foundation 32. The extensions could also be arranged in a central or upper portion of the motors 8, 9 so that they are partially let into the foundation 32. It is also possible to provide damping elements or other intermediate elements between the foundation 32 and the screw connections 35, 36, 37, 38. In an alternative embodiment (shown on the right-hand side in FIG. 3, below the motor 9) the motors 8, 9 are arranged on a rail system 41. Here the rail system 41 is shown as being disposed beneath a floor 34. The releasable connection 38 here co-operates with a roller 39 in turn co-operating with the rail system 41. It is also possible for the rail system 41 to be arranged above the floor 34 or partially sunk therein. It is also conceivable for the motors 8, 9 to have a braking or locking apparatus if they are mounted on such a rail system 41.

The motors 8, 9 have lashing points 26, 27 in an upper portion. They serve to be brought into engagement with the crane 3. In that way the motors can be lifted or transposed by means of the crane 3. Here, more than two lashing points can also be provided, depending on the respective weight, size and shape of the motors 8, 9. The lashing points 26, 27 can also be of a different shape from that shown here. In an alternative embodiment the lashing points 26, 27 are connected to the foundation 32 so that the motors 8, 9 can be lifted together with the foundation 32. In a further alternative embodiment the above-mentioned rail system 41 is arranged on the foundation 32 so that the motors 8, 9 are displaceable together with the foundation 32 on the rail system 41.

In FIG. 3 the motors 8, 9, in a lower portion, have a respective connection 28, 29 for a current converter 15, 16 or other peripheral device. The connection 28, 29 does not necessarily have to be arranged in a lower region of the motors 8, 9. It can also be of an entirely different shape. In addition there can be more than only one connection for each motor 8, 9. The current converters 15, 16 can be arranged in spaced relationship with the motors 8, 9 by way of the connections 28, 29. Cooling arrangements 31, 33 can be associated with the current converters 15, 16 (FIG. 4). The cooling arrangement 31, 33 of the current converters or current converter cabinets 15, 16 does not have to be the same cooling arrangement 19, 20 as that of the motors 8, 9. The dotted line in FIG. 4 which connects the cooling arrangements 31, 33 of the current converter cabinets 15, 16 indicates the same functional relationship as the broken line connecting the cooling arrangements 19, 20 of the motors 8, 9.

The current converter cabinets 15, 16 are respectively associated independently of each other with a motor 8, 9 (FIG. 4). Here they are connected with a dotted line. It indicates that the current converter cabinets 15, 16 can also co-operate in any way. That co-operation could be implemented in an embodiment for example by way of a common power supply.

If it is necessary for one of the motors 8, 9, for example the first motor 9, to be taken out, for example because of impending maintenance, a repair or replacement by another motor, the reasons for which may be many and varied, the procedure in the illustrated embodiment can be as follows: Firstly the motor 9 can be uncoupled from the ship drive 7. It is necessary to release the coupling 13 for that purpose. In addition the connection 29 has to be disconnected from the motor. The releasable connections 37, 38 are also to be released. When the deck 14 is opened, the crane 3 can be brought into engagement with the first removable floor panel 82 to remove it. If cargo 100 should be stored on that floor panel 82, it firstly has to be moved into another part of the intermediate deck 80. When the first removable floor panel 82 has been removed the crane 3 can be brought into engagement with the second removable floor panel 72, for example by means of the lashing points 73, through the opening. When that floor panel has also been removed the closable opening 5 is opened and the crane 3 can next be brought into engagement with the lashing point 27 on the motor 9. The motor 9 can then be lifted by means of the crane 3. The crane 3 can transport the motor 9 for example on to the first intermediate deck 70, the second intermediate deck 80 or on to the deck 14 or also on to a platform outside the ship 1. When the motor 9 has reached its target destination, the removable floor panels 72, 82 can be moved back to their original location again by means of the crane 3 and the closable opening 5 is thus closed. The ship 1 can continue its voyage with the motor 8 while the other motor 9 is maintained, repaired or the like.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A ship comprising:
    a ship drive that includes:
        a propulsion unit;
        first and second electric motors for driving the ship;
        a unit for transmitting power from the first and second electric motors to the propulsion unit so that the first and second electric motors are configured to be operated selectively and jointly; and
        one or more current converters associated with each of the first and second electric motors, the current converters being arranged in a spaced relationship with the first and second electric motors; and
    at least one crane that is configured to lift the first and second motors without the propulsion unit, wherein the at least one crane engages with one of the first and second motors through at least one closable opening in the ship.

2. The ship according to claim 1 wherein the closable opening is closable by at least one of a hatch cover, a removable floor panel, an element that includes a removable intermediate deck, or a combination thereof.

3. The ship according to claim 1 wherein the hatch cover, floor panel and intermediate deck have lashing points that engage with the at least one crane.

4. The ship according to claim 1 wherein the closable opening is configured to be opened and closed by the crane.

5. The ship according to claim 1 wherein the crane is adapted to move the at least one motor in and out of the ship, and to lift the at least one motor between a platform on the ship to a platform outside the ship.

6. The ship according to claim 1 wherein the at least one motor has lashing points.

7. The ship according to claim 1 wherein the at least one motor is fixed to the ship by a releasable connection.

8. The ship according to claim 1 wherein the at least one motor is arranged on a rail system that is configured to displace the motor in an interior of the ship.

9. The ship according to claim 1 wherein the unit of the ship drive for transmitting the power is a shaft and the first and second electric motors and the propulsion unit are arranged on said shaft.

10. The ship according to claim 1 further comprising couplings arranged on the shaft between at least one of the first and second electric motors and between one of the first and second electric motors and the propulsion unit.

11. The ship according to claim 1 wherein the first and second electric motors are ring motors comprising an internally rotating rotor and a stator ring that is disposed outwardly in the radial direction.

12. The ship according to claim 1 wherein the first and second electric motors are of substantially the same structure.

13. The ship according to claim 1 wherein the first and second electric motors have a cooling arrangement.

14. The ship according to claim 1 wherein the current converters have a cooling arrangement.

15. The ship according to claim 13 wherein the cooling arrangement is one of an air cooling arrangement and a water cooling arrangement.

16. The ship according to claim 1, wherein the ship drive is coupled to a wind power installation generator, and the generator is motor driven.

17. The ship according to claim 16 wherein the ship drive is coupled to a plurality of wind power installation generators that are of substantially the same structure.

18. A method of exchanging ship motors that are releasably fixed to an interior portion of a ship, the ship motors being for driving the ship together with peripheral devices and are coupled to a propulsion unit, the method comprising:
   uncoupling a first motor from the propulsion unit and from a second motor;
   uncoupling the first motor from the peripheral devices, the peripheral devices including a current converter;
   releasing releasable connections that fix the first motor to the interior portion of the ship;
   opening a closable opening of the ship to expose the first motor;
   bringing a crane into engagement with the first motor; and
   using the crane to lift the first motor through the closeable opening.

19. The method according to claim 18 further comprising:
   using the crane to lift the first motor into the interior portion of the ship through the closeable opening.

20. The method according to claim 18 further comprising:
   closing the closable opening.

* * * * *